O. Metcalf.
Animal-Trap.
N° 73254. Patented Jan. 14, 1868.
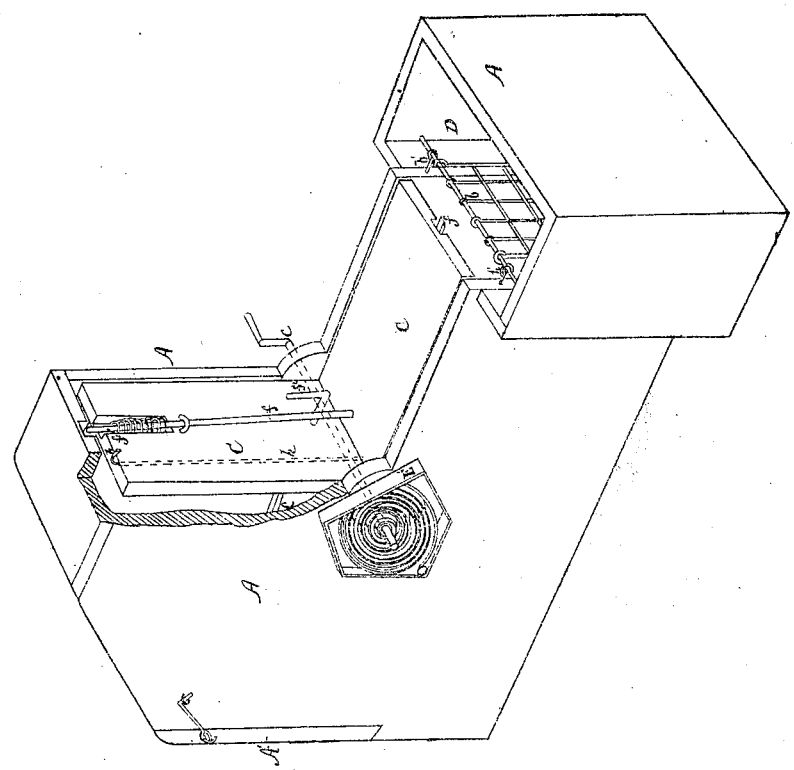
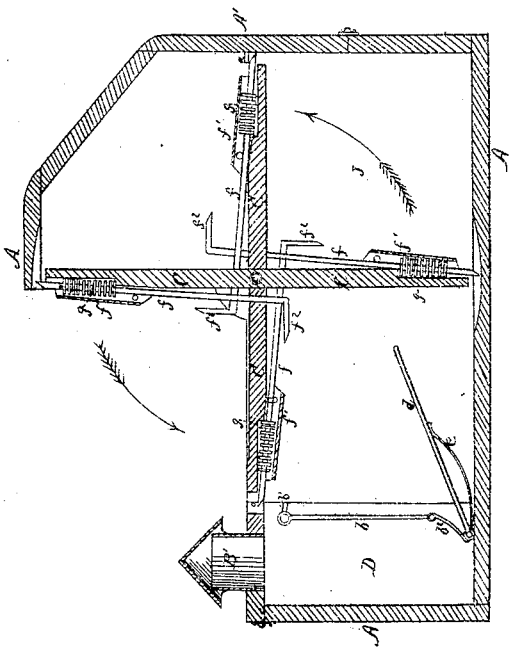
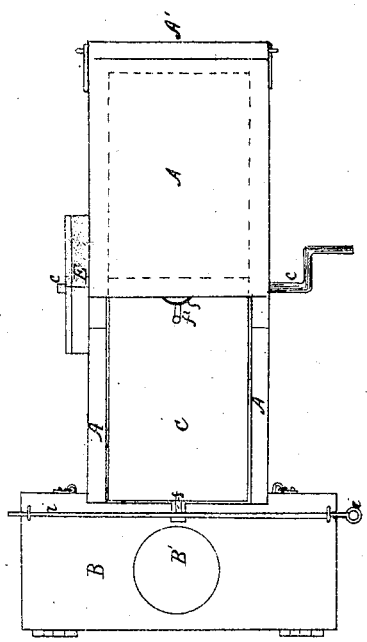
Witnesses
R. S. Campbell
Edw. Schwarz
Inventor
Oliva Metcalf
by
Mason Fenwick & Lawrence

United States Patent Office.

OLIVER METCALF, OF SALEM, INDIANA.

Letters Patent No. 73,254, dated January 14, 1868.

IMPROVED ANIMAL-TRAP.

The Schedule referred to in these Letters Patent and making part of the same.

TO ALL WHOM IT MAY CONCERN:

Be it known that I, OLIVER METCALF, of Salem, in the county of Washington, and State of Indiana, have invented a new and improved Animal-Trap; and I do hereby declare that the following is a full, clear, and exact description thereof, reference being had to the accompanying drawings making part of this specification, in which—

Figure 1 is a perspective view of the trap, with portions of it removed to expose the interior thereof.

Figure 2 is a longitudinal section taken vertically through the trap.

Figure 3 is a top view of the trap.

Similar letters of reference indicate corresponding parts in the several figures.

This invention relates to certain new and useful improvements on animal-traps, which have springs applied to them, so that when wound up they will automatically set themselves as long as the springs continue to operate.

It consists in a number of revolving platforms applied to a revolving shaft, that is acted upon by a spring, and provided with spring-latches, which are so arranged as to serve as bait-holders, said shelves being arranged in a suitable box, having an apartment for entrapping animals, and so applied to their revolving shaft that they can be readily detached from it when it is desired to wind up the spring, as will be hereinafter described.

To enable others skilled in the art to understand my invention, I will describe its construction and operation.

In the accompanying drawings, A represents a box, which is laterally enlarged at one end, so as to form the entrapping-chamber, and which is vertically enlarged at the opposite end, so as to form a right-angular chamber, G, for receiving four revolving wings or platforms, C. These platforms C are arranged at regular distances apart, around a horizontal transverse shaft, $c$, which has a hand-crank formed on one end, and which is secured to a scroll or clock-spring, E, at the other end. This spring E is applied within a small box, E', on the outside of the box A, and attached to shaft $c$ in such manner that by turning this shaft in one direction the spring can be wound up. The platforms are all keyed to the shaft $c$ by means of a rod, $h$, passing longitudinally through one of said platforms, and transversely through shaft $c$, as indicated by dotted lines in fig. 1. By withdrawing the key-rod $h$, the shaft $c$ can be rotated independently of the platforms, and the spring E in this manner wound up, after which rod $h$ is inserted into its place, and shaft $c$ locked to the platforms. Each platform is provided with a latching-rod, $f$, which is acted upon by a spring, $g$, enclosed in a shield, $f$, and which projects slightly from the outer end of its shelf, so as to engage with a catch, $a$, which is covered with rubber to prevent noise, and which is on the inside of a hinged door, A', shown in fig. 2. The inner end of each rod $f$ passes through the next platform, and is turned up so as to form a hook, $f$, upon which to secure the bait. By slightly drawing back the rod $f$, which is engaged with catch $a$, the platforms will make one-quarter of a revolution, turning in the direction indicated by the arrows in fig. 2. The entrapping-apartment D is divided from the apartment G by means of a wire curtain, $b$, which is hinged to and depends from eye-pieces $b'$. This curtain opens into the apartment D, and allows an animal to enter this apartment from the apartment G, but prevents its return. Below the swinging apron $b$, and hinged to the bottom of the box A, is a platform, $d$, which is sustained in an inclined position by means of a spring, $e$, placed under it. This platform inclines towards the apartment D, and is depressed by the platform C, as they rotate, so that an animal which drops from one of the platforms C into the apartment G, below it, will be compelled to pass into the apartment D. This apartment D is provided with a hinged cover, B, to which a ventilator, B', is applied, also with a side door, not shown in the drawings, for removing the animals one at a time. By opening the door A', at the back of the trap-box A, the platforms C may be turned by hand, and the spring E wound up without detaching the shaft $c$ from its platforms, as above mentioned.

The trap is set by applying a bait to each one of the four hooks $f^2$, and winding up the spring E. The platforms will then assume the positions shown in figs. 1 and 2. If an animal should get upon the horizontal exposed platform C, and draw back the rod $f$, which is held under the catch $a$, the platforms will make one-quarter of a revolution, and the animal will be precipitated into the apartment below, upon the false floor or platforms $d$, from which the animal will pass into the apartment D, where it will be entrapped by the hinged apron $b$. The next platform will then be brought into the same position occupied by the last one mentioned, and the trap will be again set.

Having described my invention, what I claim as new, and desire to secure by Letters Patent, is—

1. The combination of a catch, *a*, upon a hinged door, A′, with the latch-rods *f*, upon the revolving platforms C, substantially as described.

2. The hinged platform *d*, held up by a spring, *g*, and combined with the revolving platform C and apron *b*, substantially as described.

3. Connecting the platform C to the spring-shaft *c*, by means of a removable key-rod, *h*, applied substantially as described.

OLIVER METCALF.

Witnesses:
  C. W. THOMAS,
  JAMES B. AYRES.